Patented Apr. 4, 1933

1,903,283

UNITED STATES PATENT OFFICE

ERNEST M. BROGDEN AND MILES L. TROWBRIDGE, OF POMONA, CALIFORNIA, ASSIGNORS TO BROGDEX COMPANY, OF WINTER HAVEN, FLORIDA, A CORPORATION OF FLORIDA

PREPARATION OF FRESH FRUIT FOR MARKET

No Drawing. Application filed November 23, 1928. Serial No. 321,510.

This invention relates to preparation of fresh fruit for market; and it relates more particularly to protective treatment of fresh fruit, in the course of preparing it for shipment to market, whereby decay commonly caused by rot-producing organisms of various kinds is largely or wholly prevented and the attendant losses reduced or eliminated.

The invention is of general application in the commercial handling and preparation of fruit that is to be distributed to consumers in fresh or uncooked condition, including citrus fruits, apples, peaches, etc., for example. In the broader aspects of the invention, the term "fruit" as herein employed is to be understood as including also such fresh vegetables as can be treated with benefit in accordance with the procedure to be hereinafter described. The invention is employed to greatest advantage at present, however, in the treatment of citrus fruits, such as oranges, lemons, tangerines, grapefruit, and the like, also apples and pears. In the description given hereinafter, reference will be made more particularly to the treatment of citrus fruit as affording a concrete example by means of which the principles of the invention may be fully disclosed and explained.

Fresh fruits, especially citrus fruits, are subject in greater or less degree to attack by various kinds of rot or decay organisms which tend to develop and damage the fruit during the period between the time it is gathered and the time it reaches the consumer. Among these the most destructive ordinarily are the blue and green molds of which several varieties are known but which are commonly designated in the industry, and also herein, by the generic term "blue mold". Fruit of which the rind tissues have been exposed through mechanical injury of any kind, however, slight, is susceptible to attack by blue mold spores. Stem-end rot is another rot organism sometimes causing much damage to citrus fruits. These are typical of various forms of decay or rot against which treatment of fruit in accordance with the principles of the invention affords protection. Until recently, no effective means of controlling so-called blue mold rot or decay was available to the industry although the problem had been the subject of extensive research and investigations for many years by experts in fruit handling. Within the last few years, however, it has been found by the present applicants that suitable treatment of fresh fruit with solutions of certain decay-retarding or decay-inhibiting agents in water solutions of adequate concentration are effective to eliminate or at least greatly reduce the losses from blue mold decay that had previously been considered inevitable. One of the most effective of these decay-retarding agents in the treatment of fresh citrus fruits is ordinary borax ($Na_2B_4O_7.10H_2O$), and for some time past this has been in use on a large scale in citrus fruit packing houses in preparing the fruit for shipment and has proved of great benefit to the industry. Accordingly, while the present invention is generally applicable in the use of such mold-retarding agents as are suitable for use in protecting fresh fruit shipments against decay, reference will be made more particularly to the use of borax by way of a specific concrete example serving to illustrate and explain the underlying principles of the invention.

In practicing the borax process commercially, it has usually been found advisable, in order to ensure attainment of best results, to employ a treating solution containing at least about 5 or 6 ounces of borax per gallon of water in making up the solution. Much the same thing holds true of such other mold-retarding agents as have been found suitable for use in the protective treatment of fresh fruits although the proportions vary somewhat according to the reagent. In the case of borax, for example, the decay-retarding action of a solution of this strength on oranges or other citrus fruit is excellent when the treatment is carried out under proper conditions. However, the dry residue of the decay-retarding agent left on the surface of fruit treated therewith is distinctly noticeable, and for this reason ready salability of the fruit in certain markets is thereby sometimes adversely affected notwithstanding the fact that the edibility of the fruit is in no wise impaired. In general, it may be stated that when the treating solution of borax or other solid decay-retarding agent contains in excess of about 3 ounces of said agent per gallon, there is left on the surface of the fruit after it dries a visible residue which is often objectionable to the trade as above pointed out. Notwithstanding this fact, it is usually desirable to employ solutions of a strength greater than 3 ounces per gallon in order to obtain thoroughly effective and consistently reliable results from the protective treatment. The desirability of avoiding objectionable appearance of the fruit in market, and at the same time of so conducting the protective treatment as to ensure effective and reliable results, has long been recognized and various expedients have been proposed for overcoming the difficulty. To some extent these proposals have found practical application, but they have involved certain complications in carrying out the process and have therefore not afforded a thoroughly satisfactory solution of the problem from a practical standpoint.

Practical experience on a large scale with protective treatment of fresh fruit with decay-retarding agents in preparing fruit for shipment to market has also established the fact that even in the case of mold-retarding agents comprising the boric acid radical, such as alkaline borates generally and borax in particular, which have proved most effective as decay-inhibiting agents for the purposes stated, the average efficiency in decay prevention, although relatively high, is nevertheless substantially less than 100 per cent. It is accordingly another object of the present invention to increase the efficiency of such treating process.

Other objects and advantages of the invention will become apparent as the description proceeds.

It has now been found that the difficulty heretofore experienced by reason of visible residues of decay-retarding agents being left on the fruit after it dries can be overcome by applying to the fruit a solution of a decay-retarding agent in association with an agent which has the effect of lessening the visibility of such dry residue on the surface of the fruit. This action is apparently only a physical effect since the amount of the retarding agent left on the fruit after it dries is not lessened nor is its effectiveness in protecting the fruit against decay diminished. In this way, it becomes possible to employ a relatively concentrated solution of the retarding agent, thus rendering it possible to effect thorough impregnation of all exposed rind tissues and rind porosities with the retarding agent and also to ensure the presence of a protective surplus of said agent on the rind, while at the same time no residue is apparent to the eye. Various agents have been found to have this desirable effect of lessening the visibility of the dry residue of retarding agent left on fruit after protective treatment of the character described. One of the most effective and desirable agents for this purpose is casein which is effective, even in small quantities, to achieve the desired result. Other substances coming under the general head of proteins can be similarly employed, including gelatin, glue, various forms of albumen, and the like. Certain carbohydrates such as starch, dextrin, glucose and other sugars, and soluble carbohydrate gums, may also be used. As will more fully hereinafter appear these agglutinant substances, proteins and carbohydrates, herein referred to are valuable for the purposes of the present invention not only because when used as described they eliminate or greatly lessen visibility of the dry residue of solid retarding agent but also because they form on the surface of the fruit a protective film coating which aids materially in reducing withering and shrinkage of the fruit. Soap is likewise effective in many cases as a colloidal agent, but it is not classed herein as an agglutinant and does not afford the additional advantages of an agglutinant which have just been discussed. In employing these various substances, care must be taken not to employ them in such large quantities that the viscosity of the treating solution is increased sufficiently to materially interfere with its power to freely penetrate into and thoroughly impregnate all exposed rind tissues and porosities. These substances apparently act as protective colloids or dispersing agents, preventing the agglomeration of the decay-retarding agent and compelling it to remain evenly and uniformly distributed over the entire surface of the fruit in such manner as to remain imperceptible to the eye even after drying. The effect therefore, is not only to overcome the former difficulty due to objectionable appearance of the fruit, but also to enhance the effectiveness of the treatment, because under these conditions the retarding agent covers the entire surface of the fruit uniformly as an infinitely thin film instead of drawing together and becoming concentrated at more or less isolated points on the surface of the fruit while leaving other points of the surface relatively exposed. In the case of a crystalline mold-retarding agent, such as borax, the objectionable agglomeration or concentration referred to is crystallization which, in the practice of the present invention, is thus opposed and prevented by the employment of colloidal agents, such as those mentioned.

Another important advantage accruing from the use of a colloidal material, such as casein, in aqueous solution with a decay-retarding agent, such as borax, is that the resultant extremely thin coating left on the surface of the fruit after it is dry provides an ideal basis for application of a further film coating of another material better adapted to protect the fruit against shrinkage and withering. It is often advantageous to apply to fruit, whether or not it is initially treated with a mold-retarding agent, a very thin film of moisture-proofing material effective to partially seal the fruit and largely prevent the evaporation of its moisture content which normally occurs more or less rapidly in fruit not so protected. Material of a waxy nature, such as paraffin wax, either with or without an admixed oil or solvent, constitutes a good coating material, but it is difficult to apply it with the requisite uniformity to all portions of the fruit surface and at the same time avoid using so much that the breathing or transpiration of the fruit is not interfered with to an undesirable extent. This is a vital consideration because complete stoppage of this breathing or transpiration causes rapid spoilage and quickly renders the fruit valueless. It is a peculiar characteristic of the coatings of colloidal materials, particularly casein, obtained in accordance with this invention, that the surface of the fruit is thereby altered in such manner that waxy or oily material is very much more easily spread out into a uniform and very thin film thereover. This may be due to an increased compatibility of the fruit surface for oily or waxy material, but whatever the reason may be, the fact is as stated, and it constitutes an important feature of the present invention in one of its specific and particularly advantageous embodiments.

The underlying principles of the invention will be further apparent from a few concrete examples illustrating how the invention may be practiced to advantage.

In a typical instance, oranges as they come from the grove, after first being cleansed, if necessary, in any convenient manner, are introduced into a treating tank containing an aqueous solution of borax to which has been added a small amount of casein. The solution may contain 5 to 8 ounces of borax per gallon, for example, and from one-half to one ounce of casein, and the bath is most advantageously maintained warm, say at from 100° to 120° F. although it is not essential that the bath be heated. Care should be taken, however, that the temperature of the treating solution is not sufficiently high to scald, cook, or otherwise injure the fruit. The fruit is caused to travel slowly through the tank, it being desirable that the fruit remain in the bath for several minutes in order that all exposed rind tissues and porosities may be penetrated and thoroughly impregnated with the treating solution. It is an advantage to maintain the fruit completely immersed below the surface of the treating solution as it travels through the treating tank. The fruit is next transferred without rinsing to a drier where the surface moisture is evaporated. Notwithstanding the fact that the fruit thus treated carries a film coating of the decay-retarding agent and the associated colloidal material completely covering its surface, there is none of the objectionable whitish residue of dry borax which a solution of borax alone in this concentration would leave if allowed to dry on the surface of the fruit. The appearance of the fruit is excellent and if desired, it can be marketed without further treatment. It is resistant to blue mold decay and can be shipped long distances and held for long periods of time under conditions in which untreated fruit would show heavy decay.

The proportions of the ingredients given in this example may of course be varied, those mentioned merely representing good practice. For instance, the borax may be reduced to around 2 to 3 ounces per gallon and yet be far more effective in retarding decay than as though the casein were not present.

It has been found that the results are still more satisfactory if a substance in the nature of a sugar or soluble gum be used in conjunction with the casein in the solution of borax or other decay-retarding agent. Thus, if one ounce of glucose and one ounce of casein be employed in the treating solution, the resultant film coating is somewhat more flexible and therefore less likely to flake off, while at the same time it is entirely free from the slight tackiness which glucose alone, without the casein, has a tendency at times to impart. The proportions of casein and glucose may be varied, but experience indicates that about equal proportions give the most satisfactory results ordinarily. Excellent results have been obtained when using only one-half ounce each of glucose and casein in the decay-retarding solution, and there is no objection to increasing the quantity provided the fluidity of the solution is not reduced sufficiently to materially impair its penetrating and impregnating function.

While the tenaciously adherent and very thin film coatings produced on the surface of the fruit, as above described, have in themselves some sealing effect as is evidenced by a reduced tendency on the part of the fruit to wither and shrink, a still better effect is obtainable by applying to the fruit a further coating of moisture-proofing characteristics. Thus, after leaving the drier, the fruit may receive an application of paraffin wax or other waxy or oily material under conditions permitting the same to be spread out over the surface of the fruit as a uniform film-coating of such extreme thinness as hardly to be perceptible. Only a very minute quantity of the moisture-proofing material or composition, in fluid condition, need be applied to the fruit, as the peculiarly compatible character of the initial coating is such that said material has a tendency to extend or film out rapidly over the entire surface, especially if the operation is expedited by thorough rubbing of the fruit with rotary brushes.

A particularly good way to apply a film coating of paraffin to the fruit is to atomize molten paraffin to produce a fog or mist through which the fruit is passed and thereafter rubbed briskly while maintaining the temperature of the environment somewhat above the melting point of the paraffin.

Where paraffin wax or other normally solid moisture-proofing material is used in applying a final coating, it is also feasible to use it in the form of a solution or mixture with an oil or other suitable solvent, either volatile or non-volatile. One disadvantage of using such a mixture heretofore, however, has been the tendency in some cases for the solvent to penetrate to some extent into the fruit. Where the process of the present invention is employed, however, this objection is overcome because the initial coating resulting from the decay-retarding treatment prevents this action of the solvent or so impedes it that it has no harmful effect.

Another desirable characteristic of the initial film-coating is that it serves to prevent the surplus borax or other decay-inhibiting agent on the surface of the fruit from being accidentally rubbed off. It is very desirable to have this surplus present on the outer surface of the rind as well as to have the rind tissues, which may be exposed as a result of bruises, scratches or other abrasions, thoroughly impregnated with the retarding agent, but heretofore it has not been practicable, because of objectionable appearance, to have more than a relatively slight excess thus present and, moreover, this was not firmly fixed or anchored in place on the rind as it is in the present invention. Furthermore, if the decay-retarding agent employed be more or less volatile, the film coating of colloidal material, such as casein, aids greatly in preventing loss by volatilization and thus increases the permanency of the protection afforded by the retarding agent.

In another typical embodiment of the invention, the decay-retarding solution employed may be a water solution of borax and soap containing in excess of 3 ounces of borax and at least one-eighth of an ounce of soap per gallon. The employment of 4 or 5 ounces of borax and about one-fourth ounce of soap per gallon is good practice. The presence of the soap reduces the crystallizing tendency of the borax and enables a borax solution of this concentration to be used in the treating tank and allowed to dry on the surface of the fruit without any excess deposit of dry borax on the surface of the fruit being apparent to the eye. By increasing the concentration of soap in the treating solution, the concentration of borax may also be increased to a reasonable extent without encountering difficulty from unsightly excess of solid deposit on the fruit after its surface has dried off. It is seldom necessary to use more than one ounce of soap per gallon of solution, however, and usually less suffices. In recommending certain proportions of soap for use in the treating solution, reference is made for the sake of definiteness to a hard white soap of good quality ordinarily containing in the neighborhood of 30% of moisture, the remainder being substantially pure soap. Of course, it is not essential that this particular grade of soap be used, this being mentioned merely in order to afford a definite standard for convenient reference and definition of recommended proportions. The soap may advantageously be used in flaked, granulated or powdered condition in making up the treating solution. Soap powders of various kinds may also be used, but since these usually consist of soap in mixture with sodium carbonate and other additions, allowance should be made for this fact.

It may also be noted that in recommending proportions hereinabove, it is intended that the specified amounts of ingredients shall be actually contained in solution. Therefore, if hard water is used, allowance should be made for the reagents that may be precipitated out by the hardness or otherwise rendered inactive for the purpose in view. Alternatively, hard water should be softened before being used.

Among other decay-retarding agents which are capable of use in accordance with the principles hereinabove set forth may be mentioned alkaline metal carbonates and hydroxides, especially sodium carbonate, and sodium hydroxide, sodium bisulfite, and mixtures of any of these with borax; mixtures of alkaline hydroxides and/or carbonates with boric acid; and mixtures of borax and boric acid.

This application consists in part of subject matter divided out of the copending application of these applicants, Serial No. 72,808, filed December 2, 1925.

What is claimed is:

1. In the preparation of fresh fruit for market, the process of protecting the fruit against blue mold or other decay-producing organisms which comprises applying to fresh fruit a solution of a decay-retarding agent in association with a quantity of casein and a carbohydrate insufficient to render the solution substantially viscous and allowing a substantial quantity of said solution to dry upon the surface of the fruit.

2. In the preparation of fresh fruit for market, the process of protecting the fruit against blue mold or other decay-producing organisms which comprises applying to fresh fruit a solution of a decay-retarding agent in association with a quantity of casein and glucose insufficient to render the solution substantially viscous and allowing a substantial quantity of said solution to dry upon the surface of the fruit.

3. In the preparation of fresh fruit for market, the process of protecting the fruit against blue mold or other decay-producing organisms which comprises applying to fresh fruit a solution comprising borax, together with a quantity of casein and glucose insufficient to render the solution substantially viscous, and allowing a substantial quantity of said solution to dry upon the surface of the fruit.

In testimony whereof we hereunto set our signatures.

ERNEST M. BROGDEN.
MILES L. TROWBRIDGE.